(12) United States Patent
Grundman et al.

(10) Patent No.: US 7,360,340 B2
(45) Date of Patent: Apr. 22, 2008

(54) MEANS FOR SECURING THE LOWER END OF A WIND TURBINE TOWER TO A FOUNDATION

(76) Inventors: Curtis M. Grundman, 10130 N. 190th Ave., Bennington, NE (US) 68007; Dan A. Koch, 438 S. 159th Ave., Omaha, NE (US) 68118

( * ) Notice: Subject to any disclaimer, the term of this patent is extended or adjusted under 35 U.S.C. 154(b) by 473 days.

(21) Appl. No.: 11/104,154

(22) Filed: Apr. 12, 2005

(65) Prior Publication Data

US 2006/0236648 A1    Oct. 26, 2006

(51) Int. Cl.
*E04H 12/00* (2006.01)
(52) U.S. Cl. .......................... 52/40; 52/726.4; 52/295; 52/296; 52/726.1
(58) Field of Classification Search ............... 53/726.1, 53/726.3, 726.4, 153, 737.1, 736.1, 732.1, 53/651.01–651.03, 651.07, 296, 40, 731.4; 403/110, 188, 262, 312; 248/200, 300; 416/DIG. 6; 174/45 R; 343/875
See application file for complete search history.

(56) References Cited

U.S. PATENT DOCUMENTS

| | | | | |
|---|---|---|---|---|
| 3,938,297 A * | 2/1976 | Sato et al. | ................ | 403/188 |
| 4,733,986 A * | 3/1988 | Kenning et al. | ............ | 403/306 |
| 5,412,913 A * | 5/1995 | Daniels et al. | ............. | 52/79.13 |
| 5,524,408 A * | 6/1996 | Richey | ...................... | 52/514.5 |
| 6,073,405 A * | 6/2000 | Kasai et al. | .................. | 52/283 |
| 6,076,325 A * | 6/2000 | Sluiter | ....................... | 52/655.1 |
| 6,474,902 B1 * | 11/2002 | Beauvoir | .................... | 403/403 |

* cited by examiner

*Primary Examiner*—Richard E. Chilcot, Jr.
*Assistant Examiner*—Mark R Wendell
(74) *Attorney, Agent, or Firm*—Thomte Law Office LLC; Dennis L. Thomte

(57) ABSTRACT

An inverted T-shaped connection member is disclosed for securing the lower end of an upstanding wind turbine tower to a foundation with the tower comprising a plurality of longitudinally extending peripheral sections joined together with each of the peripheral sections being bent along a plurality of longitudinally extending break lines to define a plurality of angled wall sections extending between inwardly extending edge portions with the lower ends of the peripheral sections having bolt openings formed therein. Each of the inverted T-shaped connection members has a generally horizontally disposed base portion and a generally vertically disposed web portion. The base portions of the connection members are secured to the foundation by bolts or the like. The upper ends of the web portions have bolt openings formed therein with the same being secured to the lower end of the tower by means of splice plates.

14 Claims, 6 Drawing Sheets

MEANS FOR SECURING THE LOWER END OF A WIND TURBINE TOWER TO A FOUNDATION

BACKGROUND OF THE INVENTION

1. Field of the Invention

This invention relates to a means for securing the lower end of a wind turbine tower to a foundation and more particularly to a means for securing the lower end of a wind turbine tower to a foundation wherein the wind turbine tower is comprised of a plurality of elongated hollow pole sections secured together in an end-to-end relationship with each of the pole sections comprising a plurality of longitudinally extending peripheral sections joined together with each of the peripheral sections being bent along a plurality of longitudinally extending break lines to define a plurality of angled wall sections extending between inwardly extending edge portions. Although the preferred construction of the pole sections is that described above, the wall sections of the peripheral sections could be curved rather than angled. Further, the edge portions of the peripheral sections could extend outwardly, or be in an overlapping or abutting relationship.

2. Description of the Related Art

Wind turbines are becoming more popular in the production of electrical energy. A wind turbine normally comprises a rotor-driven generator mounted atop a tower which may reach heights of 70 meters or more. Normally, the lower end of the tower is bolted or anchored to a foundation embedded in the ground.

In assignee's U.S. Pat. Nos. 6,278,198; 6,505,785; and 6,522,025, a wind turbine is shown to be mounted on the upper end of a tubular tower comprised of tubular pole sections secured to one another in an end-to-end fashion. In assignee's co-pending application Ser. No. 10/797,778 filed Mar. 10, 2004, entitled "HOLLOW STRUCTURAL MEMBER", the wind turbine tower is comprised of a plurality of elongated hollow pole sections secured together in an end-to-end relationship with each of the hollow pole sections comprising a plurality of longitudinally extending peripheral sections joined together. Each of the peripheral sections is bent along a plurality of longitudinally extending break lines to define a plurality of angled wall sections extending between inwardly extending edge portions. The edge portions of the peripheral sections are bolted together to form a hollow pole section.

The fact that the hollow structural member (wind turbine tower) of the co-pending application is not perfectly cylindrical or tubular in shape makes it somewhat difficult to anchor or bolt the lowermost pole section to the foundation. A further complicating factor in securing the tower of the co-pending application to a foundation is the fact that the inwardly extending edge portions of the peripheral sections make it difficult to bolt or anchor the tower to the foundation.

SUMMARY OF THE INVENTION

A means is provided for securing the lower end of an upstanding wind turbine tower to a foundation with the tower comprising a plurality of elongated hollow pole sections secured together in an end-to-end relationship with each of the pole sections comprising a plurality of longitudinally extending peripheral sections joined together with each of the peripheral sections being bent along a plurality of longitudinally extending break lines. The longitudinally extending break lines define a plurality of angled wall sections extending between inwardly extending edge portions with the inwardly extending edge portions being secured together to form a pole section of the tower.

A plurality of inverted T-shaped connection members having a generally horizontally disposed base portion and a generally vertically disposed web portion are utilized to secure the lower end of the lowermost pole section to a foundation. The base portions of the connection members are secured to the foundation by means of bolts extending therethrough. A connection member is positioned beneath the lower end of each of the angled wall sections with the upper ends of the web portions being secured thereto by a pair of splice plates. A connection member is positioned beneath the lower ends of adjacent edge portions with the upper ends of the web portions being secured thereto by a pair of splice plates.

It is therefore a principal object of the invention to provide a means for securing the lower end of an upstanding wind turbine tower to a foundation wherein the wind turbine tower does not have a perfectly symmetrical tubular or cylindrical shape.

Still another object of the invention is to provide a means for securing the lower end of a wind turbine tower to a foundation wherein the wind turbine tower is comprised of a plurality of longitudinally extending peripheral sections which are bent along a plurality of longitudinally extending break lines to define a plurality of angled wall sections extending between inwardly extending edge portions.

A further object of the invention is to provide inverted T-shaped connection members which are secured to the foundation and which are also secured to the lower end of the lowermost pole section of the tower.

Yet another object of the invention is to provide a means of the type described wherein the connection members may not only be used to secure the angled wall sections to the foundation but which may also be used to secure the inwardly extending edge portions to the foundation.

Still another object of the invention is to provide a means of the type described above which facilitates the attachment of an irregularly-shaped pole section to a foundation.

These and other objects will be apparent to those skilled in the art.

DETAILED DESCRIPTION OF THE INVENTION

The numeral 10 refers to a hollow, elongated structural member (wind turbine tower) comprised of a plurality of elongated hollow metal pole sections 12 which are secured together in an end-to-end relationship by splice plate assemblies 14, such as described in assignee's co-pending patent application Ser. No. 10/463,155 filed Jun. 17, 2003, entitled "TWO-PLATE SPLICE CONNECTION ASSEMBLY". Pole sections 12 may be tapered or non-tapered as desired. Each of the pole sections 12 is of the type described in assignee's co-pending application Ser. No. 10/797,778 filed Mar. 10, 2004, entitled "HOLLOW STRUCTURAL MEMBER".

Figures 1, 2:
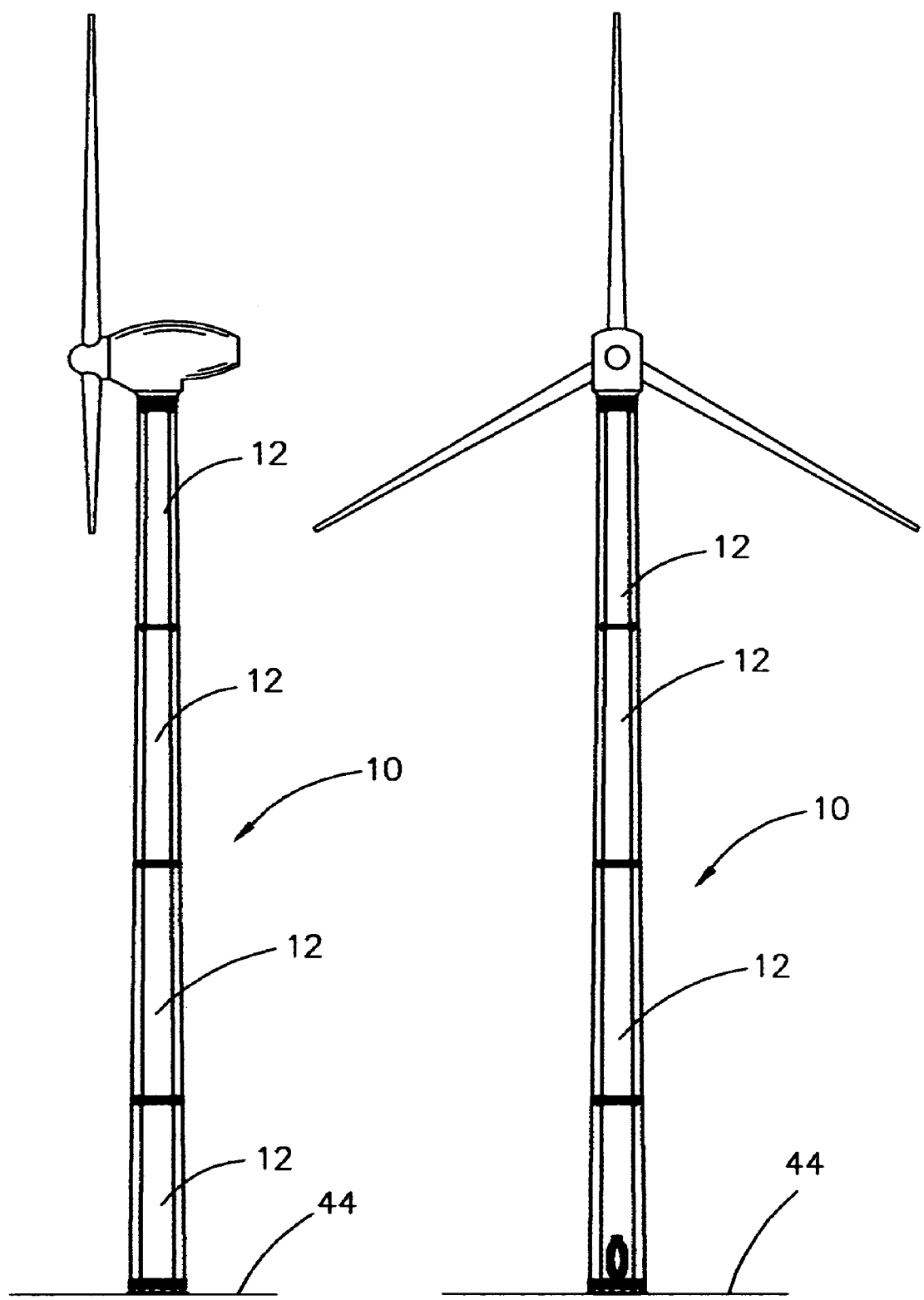
FIG. 1 is a side view of a wind turbine tower having a wind turbine mounted thereon.
FIG. 2 is a rear view of the wind turbine tower and wind turbine of FIG. 1.
Figures 3, 4:
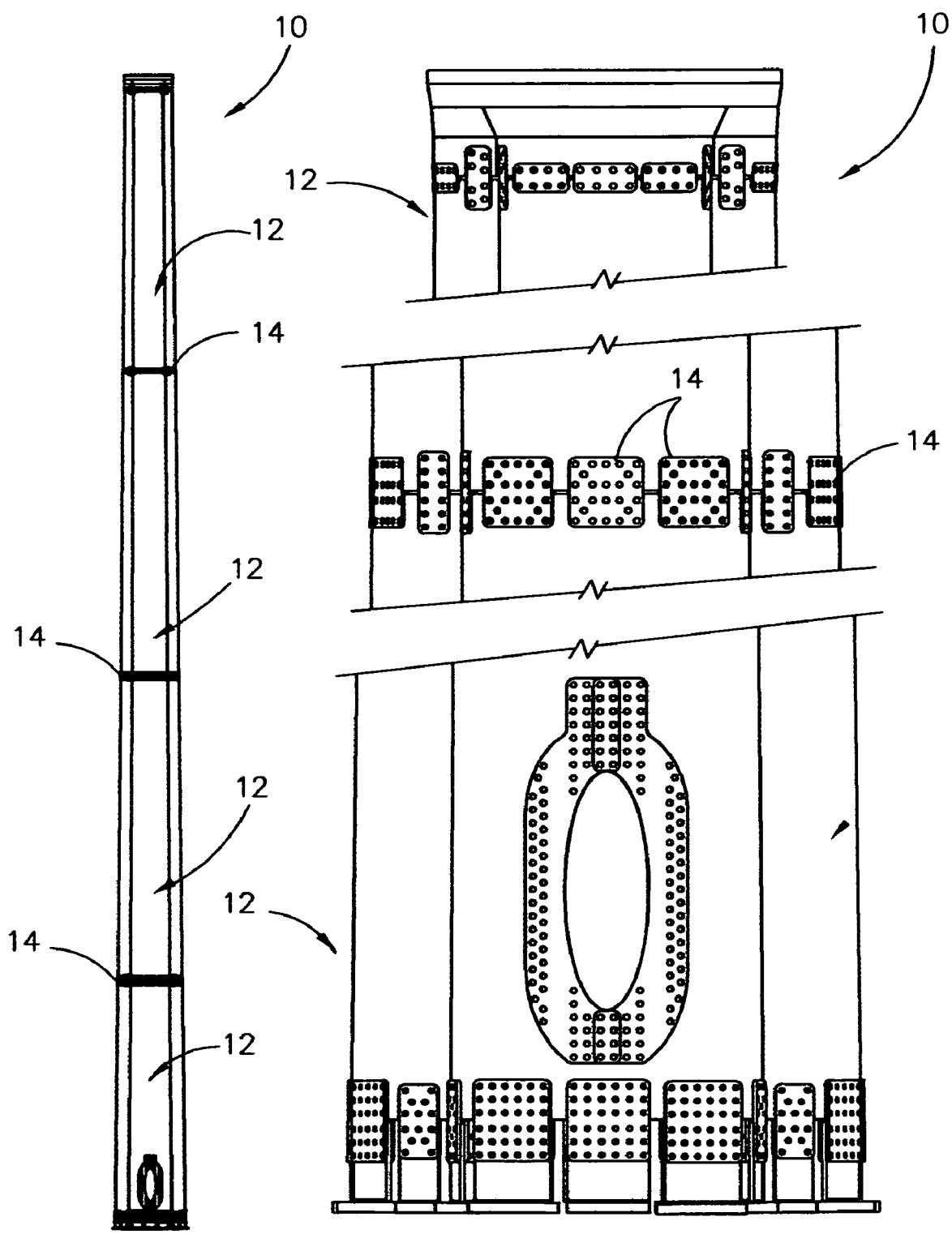
FIG. 3 is a front view of a wind turbine tower which is secured to a foundation utilizing the invention hereof.
FIG. 4 is a partial view of the wind turbine tower of FIG. 3.
Figure 5:
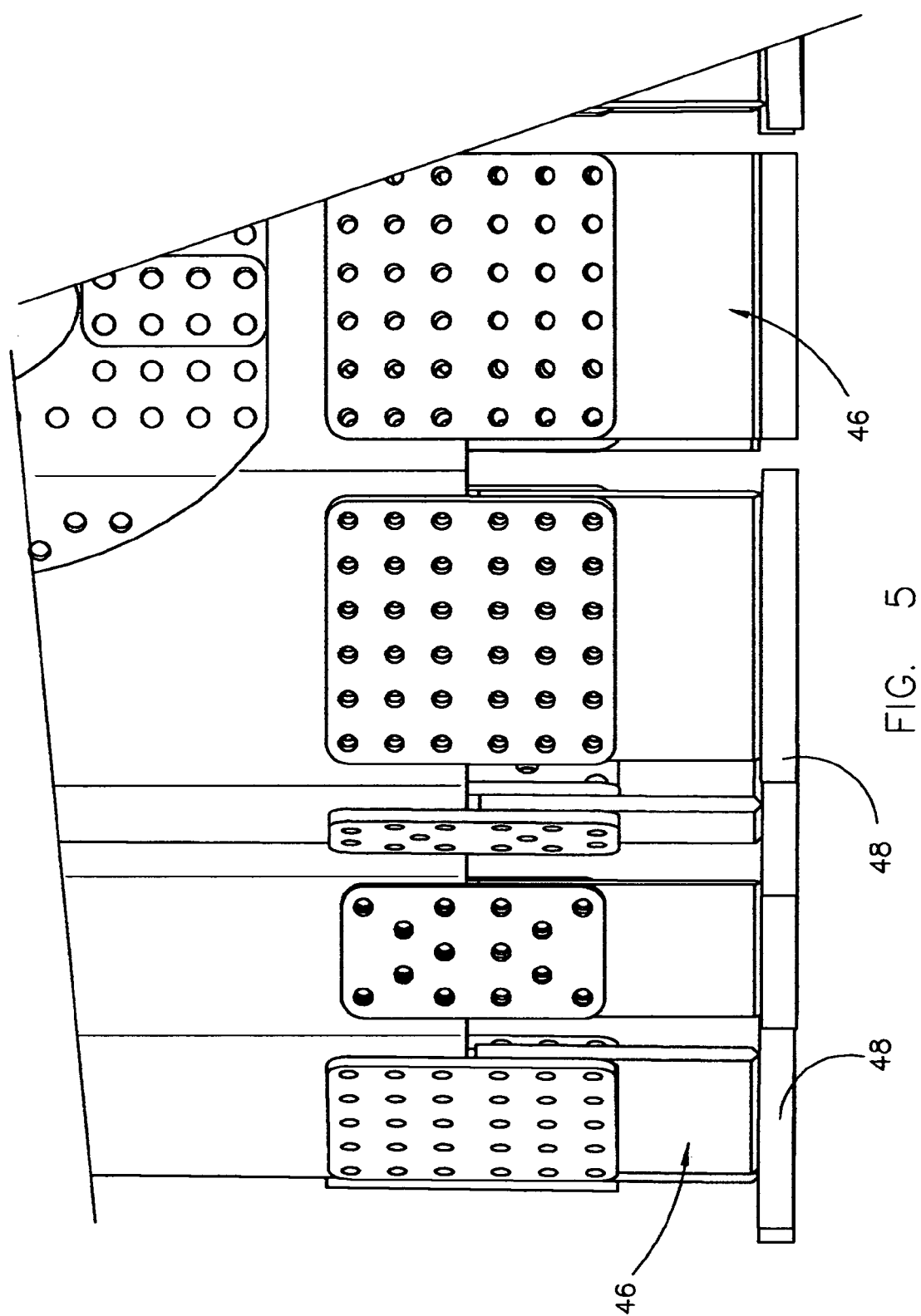
FIG. 5 is a partial plan view of the means of this invention.
Figure 6:
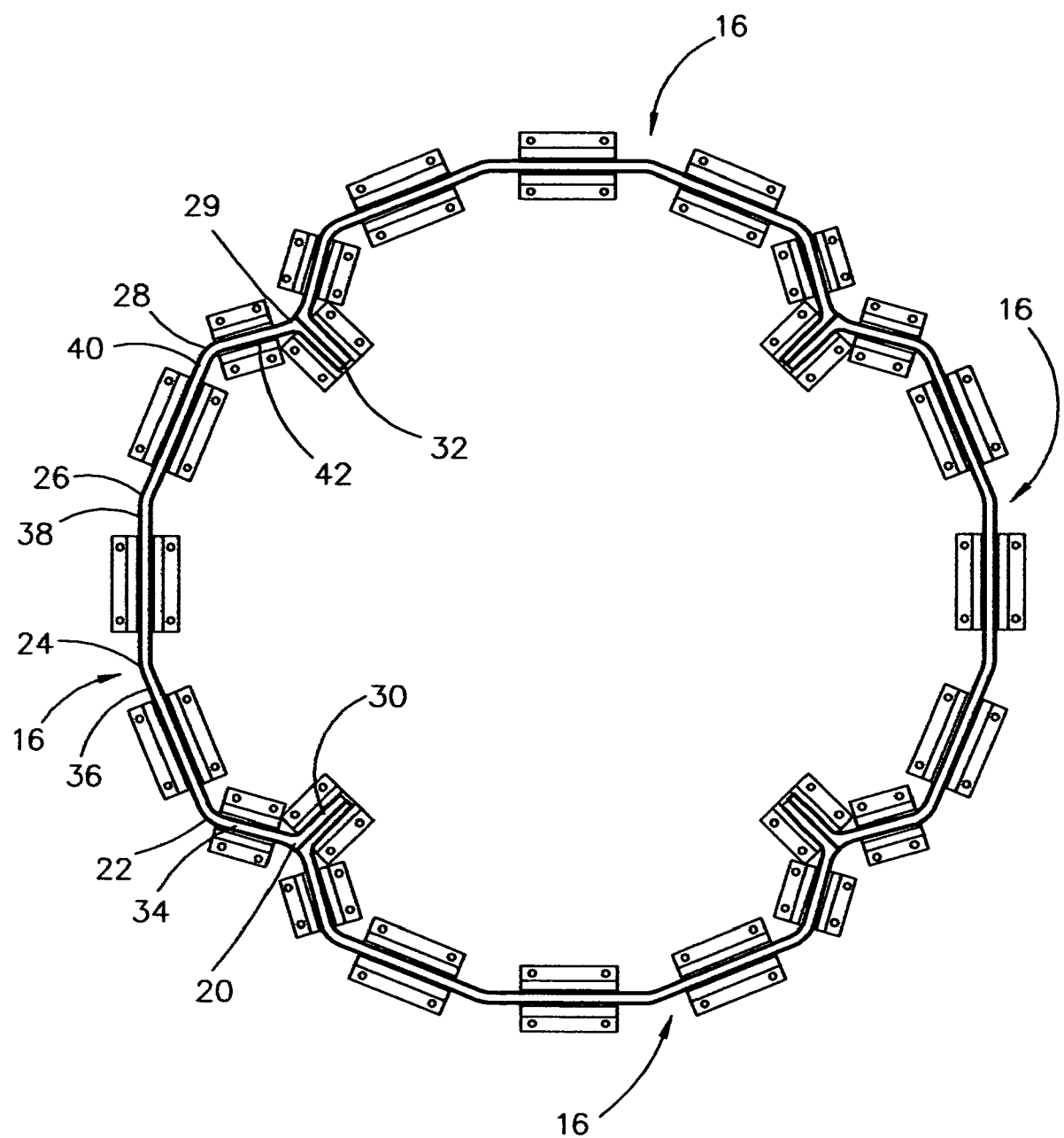
FIG. 6 is a top view illustrating the means of this invention for securing the lower end of a wind turbine tower to a foundation.

Each of the pole sections 12 is constructed of a plurality of longitudinally extending peripheral sections 16, preferably four (FIG. 6). Each section 16 is formed or bent from a flat sheet having side edges, an upper edge and a lower edge. If the wind tower is tapered, the width of the upper edge of the sheet will be less than the width of the lower end thereof. The sheet is bent or broken along break lines 20, 22, 24, 26, 28 and 29 to create the configuration seen in FIG. 6. The break lines form edge portions 30 and 32, and angled wall sections 34, 36, 38, 40 and 42. Edge portions 30 and 32 have the same width. The wall sections 36, 38 and 40 are similar in width. The wall sections 34 and 42 also have the same width.

Figure 9:
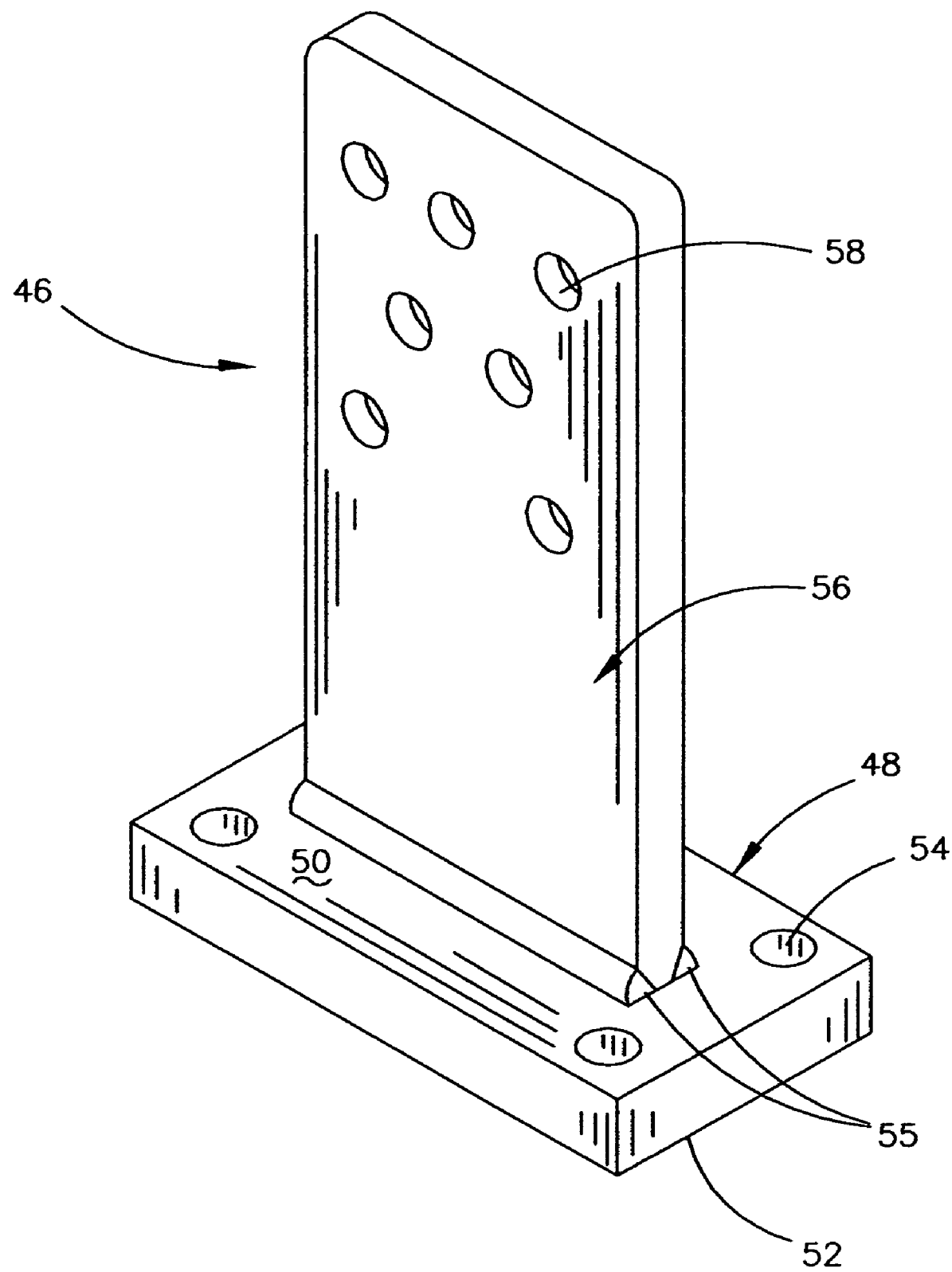
FIG. 9 is a perspective view of the connection member of this invention.

The numeral 44 refers to a conventional foundation which is embedded in the ground upon which the tower will sit. The numeral 46 refers to an inverted T-shaped connection member, a plurality of which are used, to secure the lower end of the tower to the foundation 44. Each of the connection members 46 includes a generally horizontally disposed base portion 48 having an upper surface 50 and a lower surface 52. A plurality of bolt openings 54 are formed in base portion 48 which are adapted to receive anchor bolts embedded in the foundation 44 and which extend upwardly therefrom. Each of the connection members 46 also includes an upstanding web portion 56, the lower end of which is generally V-shaped and which is welded to the upper surface of base portion 48 in the manner illustrated in FIG. 9 wherein the numeral 55 refers to the welds. The upper end of web portion 56 is provided with a plurality of bolt openings 58 formed therein adapted to receive bolt members as will be described in more detail hereinafter. The length of the base portion 48 and web portion 56 will vary depending upon whether the connection member 46 is going to be connected to the inwardly extending edge portions 30, 32, the angled wall sections 34, 42 or the angled wall sections 36, 38 and 40.

Figure 7:
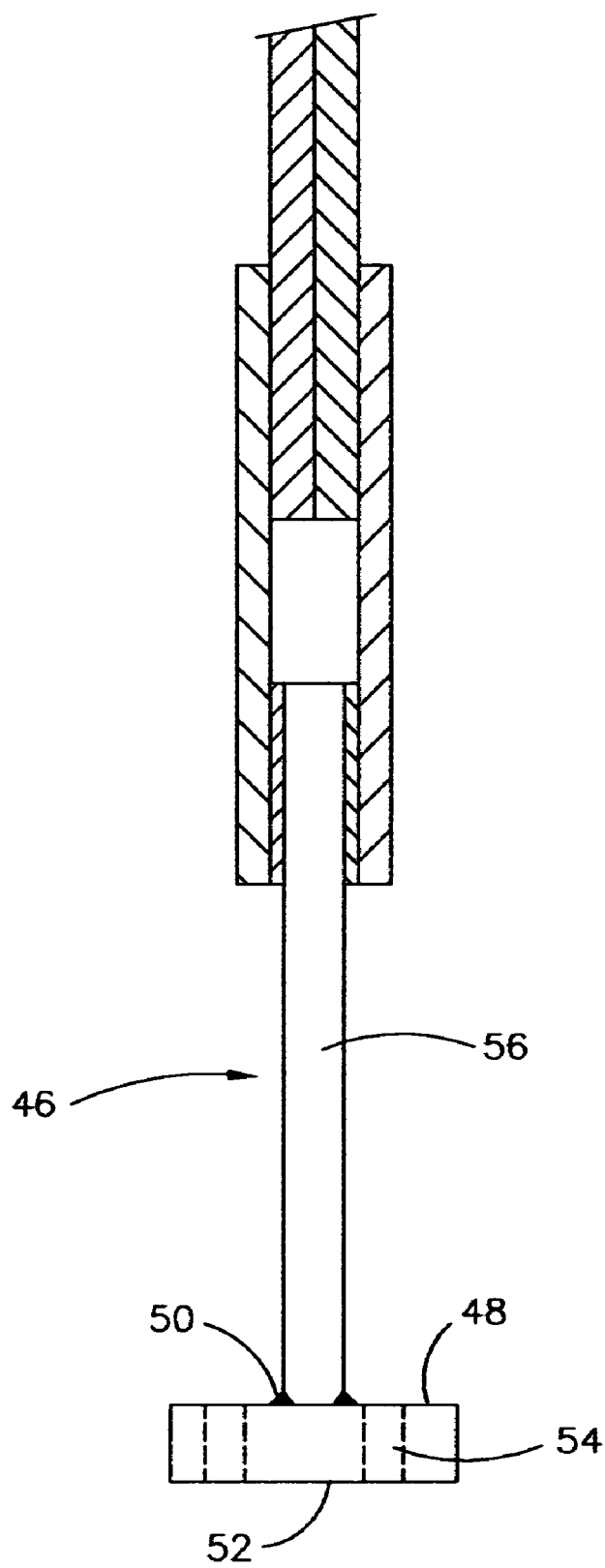
FIG. 7 is a partial sectional view illustrating the manner in which the inwardly extending side edges of the tower are secured to the foundation.

The lower end of the lowermost pole section 12 is secured to the connection members 46 as will now be described. The lowermost pole section 12 of the tower 10 will be suspended over the upper ends of the web portions 56 of the connection members 46, which have been secured to the foundation 44, with the pole section being rotated until it aligns with the proper connection members. Referring to FIG. 7, wherein the inwardly extending edge portions 30 and 32 are positioned above the upper end of a connection member 46 of appropriate length, shims 60 and 62, having bolt openings formed therein, are positioned on opposite sides of the web portion 56 at the upper end thereof and a pair of splice plates 64 and 66, having a plurality of openings formed in the lower ends thereof as well as the upper ends thereof, are secured to the web portion 56 and the shims 60, 62 by a plurality of bolts. The upper ends of the splice plates 64 and 66 are provided with a plurality of bolt openings formed therein which register with the bolt openings formed in the inwardly extending edge portions 30 and 32. Bolts are then extended through the splice plates 64 and 66.

Figure 8:
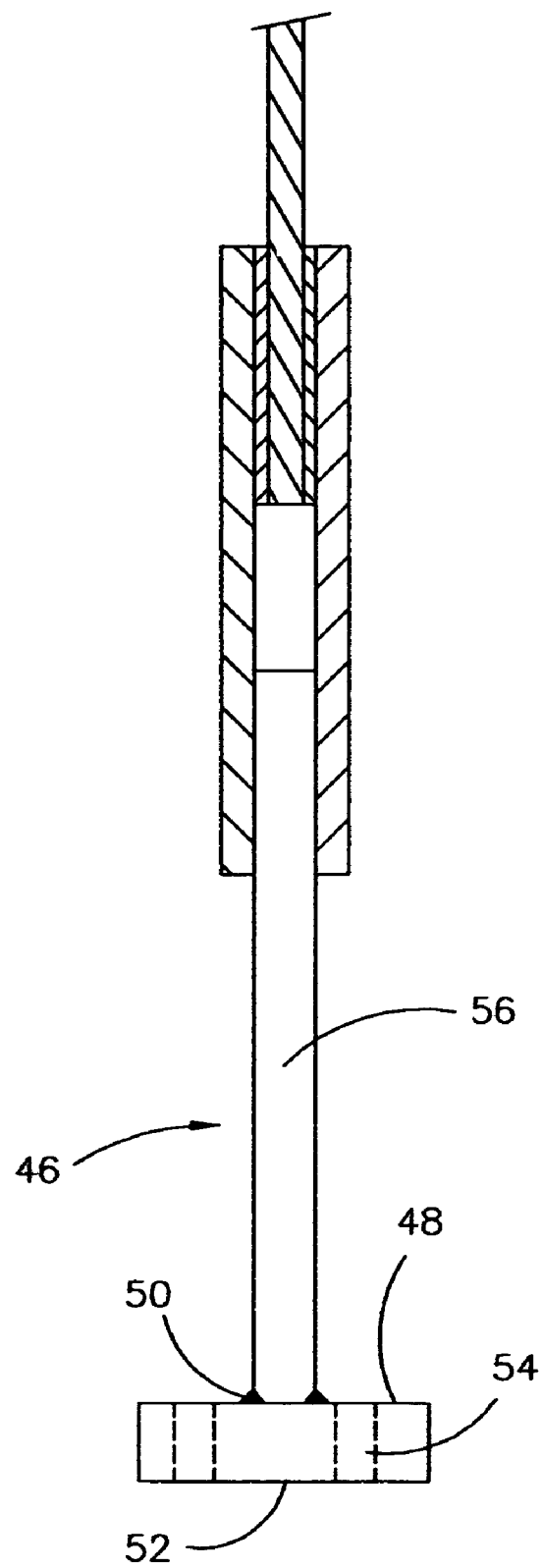
FIG. 8 is a partial sectional view illustrating the manner in which the angled wall sections of the tower are secured to the foundation.

When the connection members 46 are secured to the angled wall sections, the shims 60 and 62 will be positioned on opposite sides of the angled wall sections, as illustrated in FIG. 8, since the width of the angled wall section is less than the double thickness of the inwardly extending edge portions 30 and 32.

Thus it can be seen that the invention accomplishes at least all of its stated objectives

We claim:

1. In combination:
   a wind turbine tower foundation;
   an upstanding wind turbine tower comprising a plurality of longitudinally extending peripheral sections joined together with each of the peripheral sections defining a plurality of wall sections extending between edge portions;
   a plurality of inverted T-shaped connection members having a generally horizontally disposed base portion and a generally vertically disposed web portion, having upper and lower ends and opposite sides, secured thereto and extending upwardly therefrom;
   said base portions of said connection members being secured to said foundation;
   said upper ends of said web portions having bolt openings formed therein;
   a first splice plate, having upper and lower ends, positioned at one side of each of said web portions and at one side of the respective wall section or edge portion;
   a second splice plate, having upper and lower ends, positioned at the other side of each of said web portions and at the other side of the respective wall section or edge portion;
   a plurality of bolts extending through said lower ends of said first splice plates, said web portions, and said lower ends of said second splice plates;
   a plurality of bolts extending through said upper ends of said first splice plates, said respective wall section or edge portion, and said upper ends of said second splice plates.

2. In combination:
   a wind turbine tower foundation;
   an upstanding wind turbine tower comprising a plurality of longitudinally extending peripheral sections joined together with each of the peripheral sections defining a plurality of wall sections extending between edge portions;
   a means for securing the lower end of an upstanding wind turbine tower to a foundation with the tower comprising a plurality of longitudinally extending peripheral sections joined together with each of the peripheral sections defining a plurality of wall sections extending between edge portions, the lower ends of the peripheral sections having bolt openings formed therein, comprising:
   a plurality of inverted T-shaped connection members having a generally horizontally disposed base portion and a generally vertically disposed web portion, having upper and lower ends and opposite sides, secured thereto and extending upwardly therefrom;
   said base portions of said connection members being secured to said foundation;
   said upper ends of said web portions having bolt openings formed therein;

said upper ends of said web portions being secured to the lower ends of the respective wall section or edge portion.

3. The structure of claim 1 wherein shims are positioned between said lower ends of said splice plate and said sides of said web portion of said connection member when said upper ends of said splice plates are embracing a pair of edge portions.

4. The structure of claim 1 wherein shims are positioned between said upper ends of said splice plates and the wall section of a peripheral section.

5. The structure of claim 1 wherein a connection member is positioned at the lower end of each of the wall sections.

6. The structure of claim 5 wherein the edge portions of adjacent peripheral sections are positioned adjacent one another and wherein a connection element is secured to the lower ends of adjacent edge portions.

7. The structure of claim 6 wherein the upper ends of first and second splice plates are positioned on opposite sides of the adjacent edge portions and are secured thereto.

8. The structure of claim 6 wherein the lower ends of said first and second splice plates, which are positioned on opposite sides of the adjacent edge portions, are secured to said web portion of the associated connection element.

9. The structure of claim 8 wherein shims are positioned between said web portion and the lower ends of said first and second splice plates.

10. The structure of claim 1 wherein each of the peripheral sections are bent along a plurality of longitudinally extending break lines to define a plurality of angled wall sections which extend between inwardly extending edge portions.

11. The structure of claim 3 wherein splice plates secure the lower ends of the respective wall section or edge portion to the web portions of the connection members.

12. The structure of claim 3 wherein shims are positioned between said lower ends of said splice plate and said sides of said web portion of said connection member when said upper ends of said splice plates are embracing a pair of inwardly extending edge portions.

13. The structure of claim 3 wherein shims are positioned between said upper ends of said splice plates and the angled wall section of a peripheral section.

14. The structure of claim 3 wherein each of the peripheral sections are bent along a plurality of longitudinally extending break lines to define a plurality of angled wall sections which extend between inwardly extending edge portions.

\* \* \* \* \*